United States Patent
Vare et al.

(10) Patent No.: US 11,457,417 B2
(45) Date of Patent: Sep. 27, 2022

(54) METHOD FOR REDUCING INTERFERENCE

(71) Applicant: Teleste Oyj, Littoinen (FI)

(72) Inventors: Jani Vare, Kaarina (FI); Kari Virtanen, Naantali (FI)

(73) Assignee: Teleste Oyj, Littoinen (FI)

( * ) Notice: Subject to any disclaimer, the term of this patent is extended or adjusted under 35 U.S.C. 154(b) by 421 days.

(21) Appl. No.: 15/580,827

(22) PCT Filed: Jun. 11, 2015

(86) PCT No.: PCT/FI2015/050414
§ 371 (c)(1),
(2) Date: Dec. 8, 2017

(87) PCT Pub. No.: WO2016/198729
PCT Pub. Date: Dec. 15, 2016

(65) Prior Publication Data
US 2019/0014543 A1    Jan. 10, 2019

(51) Int. Cl.
*H04W 52/24* (2009.01)
*H04W 52/36* (2009.01)
(Continued)

(52) U.S. Cl.
CPC .......... *H04W 52/24* (2013.01); *H04W 52/28* (2013.01); *H04W 52/367* (2013.01);
(Continued)

(58) Field of Classification Search
CPC ... H04W 52/24; H04W 52/367; H04W 52/46; H04W 52/48; H04W 52/60; H04W 4/40;
(Continued)

(56) References Cited

U.S. PATENT DOCUMENTS 5,828,710 A * 10/1998 Beale .................. H04L 27/2657
375/344
7,254,421 B2    8/2007 Archiable
(Continued)

FOREIGN PATENT DOCUMENTS

CN        103476128     12/2013
EP        1427117       5/2007
(Continued)

OTHER PUBLICATIONS

Search Report from EP App. No. 15894852.1 dated Dec. 4, 2018.
(Continued)

*Primary Examiner* — Jianxun Yang
(74) *Attorney, Agent, or Firm* — Mueting Raasch Group

(57) ABSTRACT

A method and related apparatus for transferring data between a mobile communication unit and a plurality of access points, wherein each of said plurality of access points and said mobile communication unit is provided with a transceiver, said mobile communication unit being arranged to travel a predetermined route, the method comprising: adjusting transmission power of at least the transceiver of the mobile communication unit substantially to a maximum level; and attenuating transmission signal of each transceiver such that signal level of a received signal in a transmission between the mobile communication unit and each of the access points is more optimal, wherein the level of attenuation is set constant at least in the mobile communication unit.

14 Claims, 2 Drawing Sheets

(51) Int. Cl.
*H04W 52/46* (2009.01)
*H04W 52/48* (2009.01)
*H04W 52/28* (2009.01)
*H04W 52/60* (2009.01)
*H04W 4/40* (2018.01)

(52) U.S. Cl.
CPC ........... *H04W 52/46* (2013.01); *H04W 52/48* (2013.01); *H04W 52/60* (2013.01); *H04W 4/40* (2018.02)

(58) Field of Classification Search
CPC ....... H04W 4/04; H04W 36/32; H04W 40/20; H04W 84/005; H04W 52/10; H04W 52/245; H04W 48/20; H04B 1/7163
See application file for complete search history.

(56) References Cited

U.S. PATENT DOCUMENTS

| | | | |
|---|---|---|---|
| 7,359,730 | B2 | 4/2008 | Dennis et al. |
| 2003/0171102 | A1* | 7/2003 | Yang |
| 2003/0207699 | A1* | 11/2003 | Shpak ................... H04W 48/20 455/525 |
| 2005/0259619 | A1* | 11/2005 | Boettle ................. H04W 36/32 370/331 |
| 2014/0177602 | A1* | 6/2014 | Chen ..................... H04W 52/04 370/336 |
| 2016/0337985 | A1* | 11/2016 | Amizur ............... H04W 52/245 |

FOREIGN PATENT DOCUMENTS

| | | |
|---|---|---|
| EP | 1895714 | 7/2013 |
| EP | 2621212 | 7/2013 |
| WO | WO2005050855 | 6/2005 |
| WO | 2014018333 | 1/2014 |
| WO | 2015044502 | 4/2015 |

OTHER PUBLICATIONS

Aug. 19, 2015, International Search Report and Written Opinion dated Aug. 19, 2015 from PCT Application No. PCT/FI2015/050414, 7 pages.
EP Office Action dated Aug. 27, 2020 from EP Application No. 15894852.1, 6 pages.

* cited by examiner

METHOD FOR REDUCING INTERFERENCE

TECHNICAL FIELD

The invention relates to wireless data offload systems, specifically to interference reduction in such systems.

BACKGROUND

The recent explosion in the use of video, social media and Internet gaming across a range of new devices, such as smartphones and tablets, has created a huge growth in network data traffic. While the next-generation network deployments aim to offer wider bandwidth and higher data speed, the number of network users and the amount of data traffic is estimated to grow even faster, thus causing at least occasional local network congestions.

Data offload generally refers to a transfer process of data that is stored on a physical medium, such as a Network video recorder. The offload can be carried out wirelessly or with wired connection. The use of complementary or dedicated technology for the data offload purposes is especially advantageous in a situation where the data network resource allocated for the data delivery is about to reach its maximum capacity.

A specific challenge in wireless data traffic is the data delivery to and from mobile vehicles, especially public transportation vehicles, like trains, trams, metro trains and busses. A moving vehicle, as such, poses challenges to reliable data transfer, where the usable data rate typically reduces as a function of the speed of the vehicle. Many public transportation operators have started to offer a wireless data connection, such as a Wi-Fi connection, for the passengers to use during their trip. Moreover, the requirements for using video surveillance in public transportation vehicles are continuously increasing. The video data from a plurality of surveillance cameras, together with the data traffic of the passengers, easily amounts to an extensive quantity of data, which cannot be transferred within the capacity of current wireless networks without a significant delay.

A further challenge comes from the fact that wireless offload requires maximum throughput, typically meaning that the transmitting power needs to be as high as possible in order to achieve a maximum throughput. This, in turn, may significantly increase the interference that different wireless devices are causing to each other, which in turn causes packet losses and decreases robustness of offload performance.

SUMMARY

Now, an improved arrangement has been developed to reduce the above-mentioned problems. As different aspects of the invention, we present a method, a system, a mobile communication unit and an access point, which are characterized in what will be presented in the independent claims. The dependent claims disclose advantageous embodiments of the invention.

The first aspect of the invention comprises a method for transferring data between a mobile communication unit and a plurality of access points, wherein each of said plurality of access points and said mobile communication unit is provided with a transceiver, said mobile communication unit being arranged to travel a predetermined route, the method comprising: adjusting transmission power of at least the transceiver of the mobile communication unit substantially to a maximum level; and attenuating transmission signal of each transceiver such that signal level of a received signal in a transmission between the mobile communication unit and each of the access points is more optimal, wherein the level of attenuation is set constant at least in the mobile communication unit.

According to an embodiment, the method further comprises setting the level of attenuation in one or more of said plurality of access points to the same level as in the mobile communication unit.

According to an embodiment, the method further comprises adjusting the transmission power of the transceivers of one or more of said plurality of access points to a level sufficient for transmitting acknowledgements.

According to an embodiment, the method further comprises determining a group of attenuation levels, each attenuation level providing optimal received signal level in the transmission between the mobile communication unit and one of the access points; and selecting the lowest attenuation level from said group to be used at least in the mobile communication unit.

According to an embodiment, the method further comprises determining a group of distances, each distance indicating the shortest distance between the route of the mobile communication unit and one of the access points; and adjusting the constant attenuation level to be used on the basis of the longest distance in said group.

According to an embodiment, the method further comprises adjusting the transmission power of the transceivers of the access points such that interference between said plurality of access points is minimized.

According to an embodiment, the transmission signal is attenuated by an attenuator between the transceiver and an antenna of the access point or the mobile communication unit.

According to an embodiment, the transmission between the mobile communication unit and the access points is carried out according to any of IEEE 802.11 standard series.

According to an embodiment, the mobile communication unit is arranged in a public transportation vehicle, such as a train, a tram, a metro train or a bus, arranged to travel a predetermined route.

According to an embodiment, the transmission between the mobile communication unit and the access points is used in wireless offload for transmitting data from the mobile communication unit to at least one of the access points for further forwarding the data to a data communication network.

A second aspect of the invention includes a wireless offload system for transferring data between a mobile communication unit and a plurality of access points, wherein each of said plurality of access points and said mobile communication unit is provided with a transceiver, said mobile communication unit being arranged to travel a predetermined route, wherein transmission power of at least the transceiver of the mobile communication unit is arranged to be adjusted substantially to a maximum level; transmission signal of each transceiver is arranged to be attenuated such that signal level of a received signal in a transmission between the mobile communication unit and each of the access points is more optimal, wherein the level of attenuation is constant at least in the mobile communication unit.

A third aspect of the invention relates to a mobile communication unit of a wireless offload system, said mobile communication unit comprising a transceiver, and said mobile communication unit being arranged to travel a predetermined route, wherein transmission power of the transceiver of the mobile communication unit is arranged to be adjusted substantially to a maximum level; transmission signal of the transceiver is arranged to be attenuated such that signal level of a received signal in an access point is more optimal, wherein the level of attenuation is constant.

A fourth aspect of the invention relates to an access point of a wireless offload system, said access point comprising a transceiver, said access point being arranged in a vicinity of a predetermined route of a mobile communication unit, wherein the transmission power of the transceivers is at a level sufficient for transmitting acknowledgements; and transmission signal of the transceiver is arranged to be attenuated such that signal level of a received signal in the mobile communication unit is more optimal.

BRIEF DESCRIPTION OF THE DRAWINGS

The invention will now be described in more detail in connection with preferred embodiments with reference to the appended drawings, in which.

DETAILED DESCRIPTION

Figure 1:
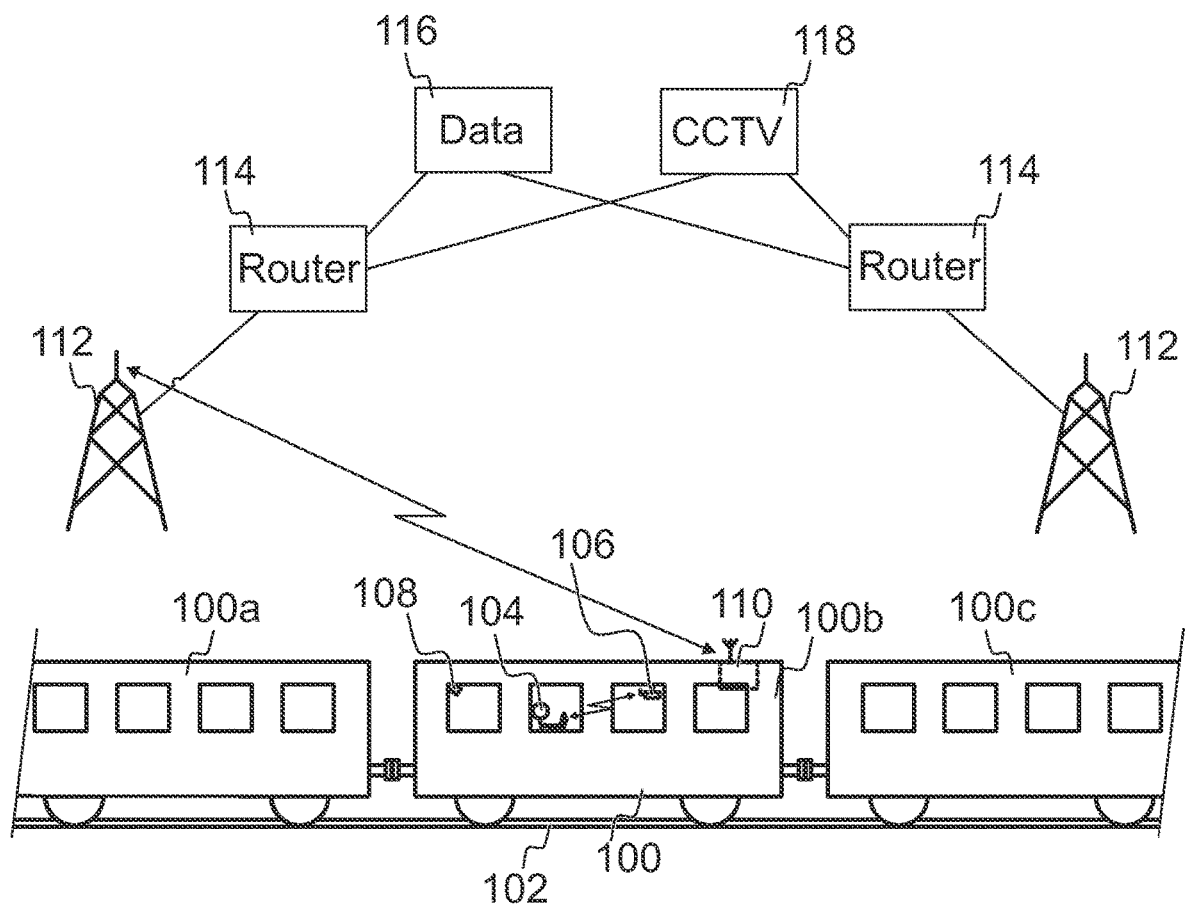
FIG. 1 shows a simplified example of the operating principle of a wireless data offload system.

The rapid development of WLAN (wireless local area networks) technology has made the WLANs popular, besides in the home due to ease of installation and use, but also in offices and various public premises (so-called Hot-Spots) offering wireless access either to a limited group of users or to anyone. While various names and acronyms, such as WLAN, Wi-Fi, 802.11, etc. are used for wireless local area networks, they all typically refer to wireless access technology defined in IEEE standard series 802.11, including multiple versions of the IEEE 802.11, such as 802.11b, 802.11g, 802.11a, 802.11n, 802.11ac. Unlike licensed spectrum devices, such as mobile cellular networks, where the usage of bandwidth is strictly controlled, IEEE 802.11 technology is used as a shared medium that operates in unlicensed radio frequency ranges of 2.4 GHz and/or 5 GHz.

For this reason, WLAN clients and access points (AP) are vulnerable to interference caused by potential sources for interference, such as existing WLANs, rogues, and non-802.11 interference from sources such as weather radars and marine/aviation radars, and in some occasions also microwave ovens and many cordless telephones. If a WLAN client detects another signal, whether it is a WLAN signal or not, it will defer transmission until the signal ceases. Interference that occurs during transmission also causes packet loss, which forces WLAN retransmissions slowing throughput and resulting in non-uniform performance for all users sharing the same access point.

When operating in a rather stable environment, such as home or office, RF interference can be addressed by at least three different approaches: lowering the physical (PHY) data rate, reducing the transmit power of the affected AP or changing the AP's channel assignment. While each of these can be useful in some respect, none of them addresses directly with RF interference.

The omni-directional dipole antenna of a typical WLAN AP sends and receives transmissions equally in all directions. Upon interference, the AP must lower its physical data rate until an acceptable level of packet loss is achieved. However, the longer transmission time makes the data packets more susceptible to periodic interference. Moreover, the approach is highly inefficient, and subsequently all users sharing the AP experience poorer performance.

Another method for addressing the interference is to reduce the AP transmit power to make better use of the limited number of channels. This reduces the number of devices sharing the AP, which may improve performance, but it also lowers the signal strength received by the clients. This translates into a lower data rate and smaller WLAN cells that can create coverage holes.

Accordingly, in a rather stable environment, such as home or office, the most recommended way of addressing the interference is changing the AP's channel assignment; i.e. selecting automatically a different or "interference-free" channel for the AP when RF interference increases. While changing channels has turned out to be a useful technique to deal with continuous interference on a given frequency, in many occasions interference tends to be highly variable and intermittent. With a limited number of available channels such a situation may be difficult handle.

A known method for reducing interference is to use directional or adaptive antennas. Again, directional antenna may be useful in a stable environment, but the alignment of a directional antenna becomes very challenging in mobile environment. Adaptive antennas, in turn, are expensive and require built-in intelligence in the system.

While the above methods may be helpful in addressing interference in a stable environment, they are poorly applicable to situations where the WLAN client is moving such that the primary direction of transmission between the client and a particular AP may be different with each AP. The applicability of the above methods becomes even poorer, if the data transmission involves a great amount of data. Such a situation may occur, for example, in a wireless data offload system.

FIG. 1 shows a simplified example of the operating principle of a wireless data offload system. FIG. 1 illustrates a rail traffic vehicle 100, such as a train, a tram or a metro train, travelling on the rails 102. The rail traffic vehicle 100 may comprise one or more cars 100a, 100b, 100c, etc., typically arranged to transport passengers. A wireless data connection, such as a Wi-Fi connection, may be offered for the passengers to be used during their trip. In FIG. 1, a passenger 104 uses his/her mobile device via a wireless connection provided by a wireless base station 106. Moreover, each car may include one or more surveillance cameras 108 capturing video surveillance data within the car. During the trip, especially the video surveillance data may amount to an extensive quantity of data.

The vehicle 100 comprises at least one mobile communication unit 110, which is arranged to communicate with at least one access point 112 arranged along a route of the vehicle 100. The mobile communication unit 110 is arranged to obtain data from one or more data sources, such as one or more surveillance cameras and/or one or more data terminals operated by passengers, arranged in functional connection with the mobile communication unit. The mobile communication unit 110 comprises a transmitter arranged to transmit the data to the access point 112.

The access point 112 comprises a receiver arranged to receive the data, and it is further arranged to forward the data to a data target for decoding. The data targets may comprise, for example, a data communication network 116 and a video surveillance system 118, and the access point 114 may be arranged to forward the video data from said one or more surveillance cameras to the video surveillance system 118 and user data from said one or more data terminals operated by the passengers to the data communication network 116. The system may comprise one or more routers 114 arranged to route the data to an appropriate data target.

The mobile communication unit 110 may further comprise a video recorder arranged to buffer at least a part of the video data from said one or more surveillance cameras and/or a data storage arranged to buffer at least a part of the user data from said one or more data terminals operated by the passengers before transmission to the access point.

A public transportation vehicle, such as a train, a tram, a metro train or a bus, is typically arranged to travel a predetermined route, whereby the system may comprise a plurality of access points arranged along said route. The access points may be positioned, for example, at the stations where the vehicle is configured to stop, whereby the buffered video and/or user data may be transferred to the access point during the stoppage. On the other hand, the plurality of access points may be distributed along the route such that the video data from said one or more surveillance cameras and/or the user data from said one or more data terminals operated by the passengers may be transferred to an access point substantially continuously during the trip.

As becomes evident from the above, the amount of data to be transmitted from the mobile communication unit to the access point may be very large. Furthermore, the speed of the vehicle may further make the transmission conditions in terms of interference highly variable and intermittent. On the other hand, wireless offload requires maximum throughput and hence typically this means that the transmitting power needs to be as high as possible in order that maximum throughput can be achieved.

Thus, there is a need for a reliable and inexpensive solution for addressing these mutually conflicting conditions and requirements.

In order to alleviate these problems, a new method for transferring data between a mobile communication unit and a plurality of access points is presented herein. The method is based on the idea of improving offload performance by decreasing interference of access points by attenuating received signals. The attenuation of the transmitted signal is compensated by increasing the power of transmitted signal.

Figure 2:
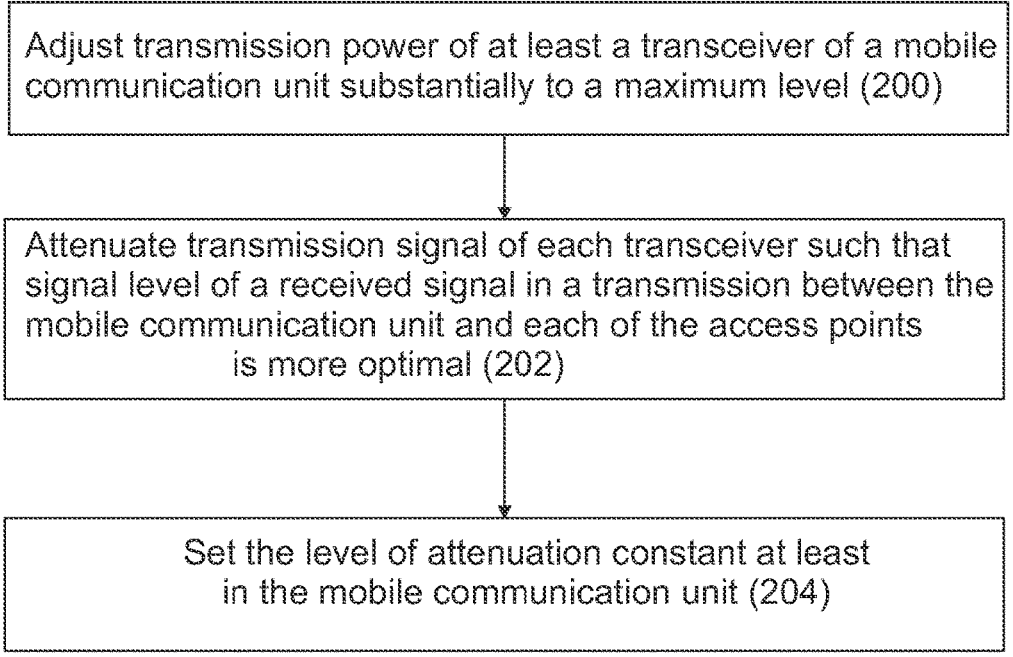
FIG. 2 shows a flow chart of an interference reduction method according to an embodiment.

A method according to a first aspect and various embodiments related thereto are now described by referring to the flow chart of FIG. 2. The method of FIG. 2 may be applied in a system, wherein each of a plurality of access points and a mobile communication unit is provided with a transceiver, and said mobile communication unit is arranged to travel a predetermined route. The method comprises adjusting (200) transmission power of at least the transceiver of the mobile communication unit substantially to a maximum level, and attenuating (202) transmission signal of each transceiver such that signal level of a received signal in a transmission between the mobile communication unit and each of the access points is more optimal, wherein the level of attenuation is set constant (204) at least in the mobile communication unit.

Hence, the maximum throughput requirement of the wireless offload system is addressed by adjusting the transmission power of each transceiver, both in the access points and in the mobile communication unit, to a high enough level. At least in the transceiver of the mobile communication unit this means adjusting the transmission power substantially to a maximum level. As a result, the power level received by an antenna (RSSI, Received Signal Strength Indicator) of the access point becomes very high. As such, this would create significant interference between the transceivers. This is compensated by attenuating the transmission signal of each transceiver such that the signal level of a received signal in a transmission between the mobile communication unit and each of the access points is at wanted level. By increasing the attenuation, the sensitivity of the transceivers is decreased, which, in turn, reduces the receiver cell size and decreases interference in the transmission between the mobile communication unit and the access point. The level of attenuation is set constant at least in the mobile communication unit, possibly also in each of the access points. This simplifies the implementation since no adjustments of transmission, such as channel changes or configuration of attenuation, are required, but the mobile communication unit may operate successfully throughout the wireless offload system.

According to an embodiment, the method further comprises adjusting the transmission power of the transceivers of one or more of said plurality of access points to a level sufficient for transmitting acknowledgements. It is noted that the transmission power of the access points does not necessarily need to be maximum, since especially in wireless offload environment the main purpose is to maximize link rates from the mobile communication unit to the access point. The data traffic from the access point to the mobile communication unit comprises mostly low-bitrate acknowledgements. Thus, for the transmission channel from the access point to the mobile communication unit, it is only required that the RSSI or link rate is at sufficient level, which may be significantly lower than the maximum level.

For example, considering a 802.11n network, experiments have shown that for the transmission channel from the mobile communication unit to the access point, the Signal-to-Noise Ratio (SNR) needs to be over 25 dB, preferably over 28 dB. However, for the transmission channel from the access point to the mobile communication unit the SNR may be a lot lower; in practice the link may be operable with SNR values of lower than 10 dB.

According to an embodiment, the method further comprises setting the level of attenuation in one or more of said plurality of access points to the same level as in the mobile communication unit. Thus, best results in interference reduction are probably achieved, if the level of attenuation is set the same in the mobile communication unit and in each of the access points. Nevertheless, it is further noted that remarkable reduction in interference may be achieved even if the level of attenuation is somewhat different in the mobile communication unit and in one or more access points.

According to an embodiment, the transmission signal is attenuated by an attenuator between the transceiver and an antenna of the access point or the mobile communication unit. Thus, by placing an appropriately adjusted attenuator between the transceiver and the antenna, a straightforward and an inexpensive way for adjusting the attenuation level to compensate for the maximum transmission power is provided. The attenuator may preferably be an adjustable-stepped attenuator and a continuously adjustable attenuator so as to control the received signal level to be appropriate.

According to an embodiment, the method further comprises determining a group of attenuation levels, each attenuation level providing optimal received signal level in the transmission between the mobile communication unit and one of the access points; and selecting the lowest attenuation level from said group to be used at least in the mobile communication unit.

Thereby, the attenuation level may be determined while the mobile communication unit moves along its predetermined route, wherein the multiple access points are arranged in the vicinity of the route. When the mobile communication unit approaches the first access point, a first attenuation level is determined for the transmission between the mobile communication unit and the first access point such that received signal level is optimal, thus providing the minimum cell size around the first access point. The mobile communication unit then continues to travel along its route and approaches the second access point. A second attenuation level is then determined for the transmission between the mobile communication unit and the second access point providing the minimum cell size around the second access point.

The same procedure is repeated for the multiple access points, thereby determining a group of attenuation levels $G_{AL}$ comprising the first attenuation level, the second attenuation level, etc.; $G_{AL}=\{AL_1, AL_2, \ldots, AL_n\}$, where n is the number of access points. From the group of attenuation levels $G_{AL}$, the lowest attenuation level, i.e. min $(G_{AL})$=min $\{AL_1, AL_2, \ldots, AL_n\}$ is selected to be used at least in the mobile communication unit. The lowest attenuation level corresponds to the weakest transmission conditions between the mobile communication unit and one of the access points; i.e. the weakest received signal without the attenuation applied. In other words, by selecting the lowest attenuation level to be used in the mobile communication unit, the worst-case scenario along the route of the mobile communication unit is met, thereby ensuring that the communication is most probably successful with other access points as well.

According to an embodiment, the method further comprises determining a group of distances, each distance indicating the shortest distance between the route of the mobile communication unit and one of the access points; and adjusting the constant attenuation level to be used on the basis of the longest distance in said group.

Thus, in addition to or instead of determining the group of attenuation levels, adjusting the constant attenuation level may be simplified or supplemented by measuring the shortest distances between the route of the mobile communication unit and each of the access points. Thus, for each of the access points, the shortest distance between the route of the mobile communication unit and the particular access point is determined. All said distances may be grouped as a group of distances $G_D$ comprising the first distance (the shortest distance between the route of the mobile communication unit and the first access point), the second distance, etc.; $G_D=\{D_1, D_2, \ldots, D_n\}$, where n is the number of access points. From the group of distances $G_D$, the longest distance, i.e. max $(G_D)$=max $\{D_1, D_2, \ldots, D_n\}$ is selected to be used as a basis for adjusting the attenuation level at least in the mobile communication unit. The longest distance typically corresponds to the weakest transmission conditions between the mobile communication unit and one of the access points; i.e. the weakest received signal without the attenuation applied. Again, by selecting the longest distance to be used as a basis for adjusting the attenuation level in the mobile communication unit, the worst-case scenario along the route of the mobile communication unit is met, thereby ensuring that the communication is most probably successful with other access points as well.

Figure 3:
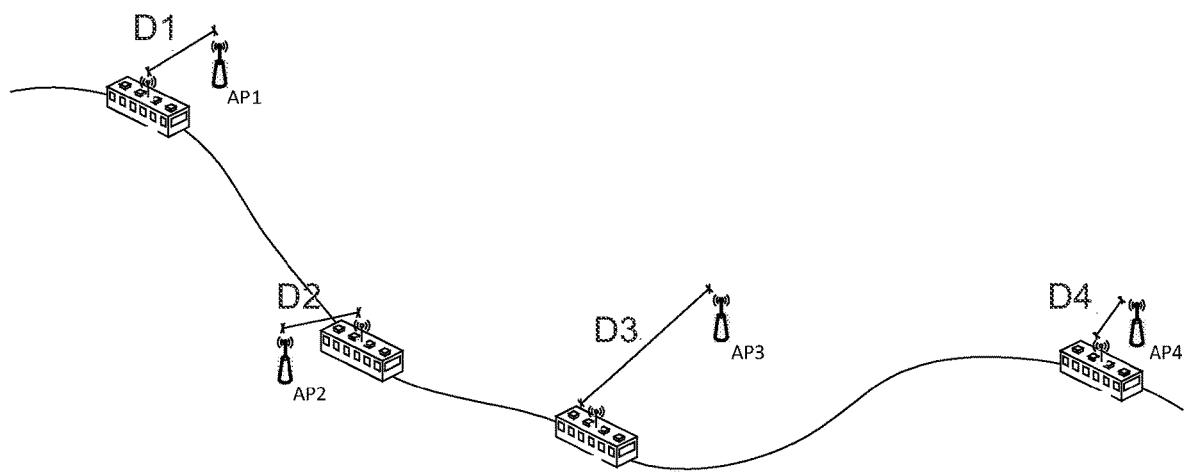
FIG. 3 shows an example of determining the attenuation level according to the worst-case scenario according to an embodiment.

This can be illustrated by an example shown in FIG. 3, where a train is travelling along its route, the route having four access points AP1-AP4 in the vicinity of the route. The shortest distance from the route to each of the access points is indicated as D1-D4, correspondingly. As can be seen in FIG. 3, from the group of distances $\{D_1, D_2, D_3, D_4\}$ distance $D_3$ is the longest; i.e. max $\{D_1, D_2, D_3, D_4\}=D_3$.

Therefore, the worst-case scenario for the attenuation is determined based on distance $D_3$ between the route and AP3.

According to an embodiment, the method further comprises adjusting the transmission power of the transceivers of the access points such that interference between said plurality of access points is minimized. Hence, if the distance between two or more access points is short, which may be the case especially in urban environment, the access points may cause interference to each other. Therefore, it is preferable to take the interference between the access points into account, and adjusting the transmission power of the transceivers of the access points at the access points such that the mutual interference is minimized. As described above, the transmitting power can be lower in the access points since wireless offload needs high throughput only from the mobile communication unit to the access point and bitrates from the access point to the mobile communication unit are typically significantly lower. This helps to minimize interference between access points.

According to an embodiment, the transmission between the mobile communication unit and the access points is carried out according to any of IEEE 802.11 standard series. While the WLAN technology according to any of IEEE 802.11 standard series provides several advantages in wireless data offload, it is undeniable that the interference problem arises especially in radio communication taking place on unlicensed radio frequency ranges. It is, however, noted that the implementation of the embodiments disclosed herein are not limited to the WLAN technology according to any of IEEE 802.11 standard series only, but the embodiments may be applied to any similar wireless communication technology encountering the interference problem.

In the above examples the mobile communication unit has been described as being connected to a public transportation vehicle. However, the embodiments are not limited to vehicles, but at least some of the embodiments are applicable, for example, to any portable or handheld communication devices, such mobile phones, smart phones, tablets or laptop computers.

A skilled man appreciates that any of the embodiments described above may be implemented as a combination with one or more of the other embodiments, unless there is explicitly or implicitly stated that certain embodiments are only alternatives to each other.

With the arrangement described above, interference of a plurality of wireless devices can be minimized and hence the performance of wireless offload may be improved. Moreover, by determining the attenuation level based on the worst case scenario, a simplified implementation of the attenuation is enabled in a system where the distance between the mobile communication unit and the access points varies.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for transferring data between a mobile communication unit and a plurality of access points, wherein each of said plurality of access points and said mobile communication unit is provided with a transceiver, said mobile communication unit being arranged to travel a predetermined route, the method comprising:
   adjusting transmission power of at least the transceiver of the mobile communication unit substantially to a maximum level; and attenuating transmission signal of the transceivers of said plurality of access points and said mobile communication unit such that Signal-to-Noise Ratio (SNR) in a transmission from the mobile communication unit to each of the access points is over 25 dB and the SNR in a transmission from the access points to the mobile communication unit is not higher than 10 dB, wherein the level of attenuation is set constant at least in the mobile communication unit.

2. The method according to claim 1, further comprising: adjusting the transmission power of the transceivers of one or more of said plurality of access points to a level sufficient for transmitting acknowledgements.

3. The method according to claim 1, further comprising: determining, by said mobile communication unit, a group of attenuation levels, each attenuation level providing optimal received signal level in the transmission at least from the mobile communication unit to one of the access points; and selecting the lowest attenuation level from said group to be used at least in the mobile communication unit.

4. The method according to claim 1, further comprising: determining a group of distances, each distance indicating the shortest distance between the route of the mobile communication unit and one of the access points; and adjusting the constant attenuation level to be used on the basis of the longest distance in said group.

5. The method according to claim 1, further comprising: adjusting the transmission power of the transceivers of the access points such that interference between said plurality of access points is minimized.

6. The method according to claim 1, wherein the transmission signal is attenuated by an attenuator between the transceiver and an antenna of the access point or the mobile communication unit.

7. The method according to claim 1, wherein the mobile communication unit is arranged in a public transportation vehicle, such as a train, a tram, a metro train or a bus, arranged to travel a predetermined route.

8. A wireless offload system for transferring data between a mobile communication unit and a plurality of access points, wherein each of said plurality of access points and said mobile communication unit is provided with a transceiver, said mobile communication unit being arranged to travel a predetermined route, wherein transmission power of at least the transceiver of the mobile communication unit is arranged to be adjusted substantially to a maximum level;

transmission signal of the transceivers of said plurality of access points and said mobile communication unit is arranged to be attenuated such that Signal-to-Noise Ratio (SNR) in a transmission from the mobile communication unit to each of the access points is over 25 dB and the SNR in a transmission from the access points to the mobile communication unit is not higher than 10 dB, wherein the level of attenuation is constant at least in the mobile communication unit.

9. A mobile communication unit of a wireless offload system, said mobile communication unit comprising a transceiver, and said mobile communication unit being arranged to travel a predetermined route, wherein transmission power of the transceiver of the mobile communication unit is arranged to be adjusted substantially to a maximum level;

transmission signal of the transceiver is arranged to be attenuated such that Signal-to-Noise (SNR) is over 25 dB, wherein the level of attenuation is constant.

10. The mobile communication unit according to claim 9, wherein a group of attenuation levels is arranged to be determined, each attenuation level providing optimal received signal level in the transmission between the mobile communication unit and one or more access points; and the lowest attenuation level from said group is used at least in the mobile communication unit.

11. The mobile communication unit according to claim 9, wherein a group of distances is arranged to be determined, each distance indicating the shortest distance between the route of the mobile communication unit and one of the access points; and the constant attenuation level to be used is arranged to be adjusted on the basis of the longest distance in said group.

12. The mobile communication unit according to claim 9, further comprising an attenuator between the transceiver and an antenna of the mobile communication unit.

13. The mobile communication unit according to claim 9, wherein the transmission between the mobile communication unit and the access points is arranged to be carried out according to any of IEEE 802.11 standard series.

14. The mobile communication unit according to claim 9, wherein the mobile communication unit is arranged in a public transportation vehicle, such as a train, a tram, a metro train or a bus, arranged to travel a predetermined route.

* * * * *